United States Patent [19]

Hall et al.

[11] 4,387,951
[45] Jun. 14, 1983

[54] CATHODE RAY TUBE DISPLAY TERMINAL WITH A REMOVABLE POWER SUPPLY

[75] Inventors: Roger L. Hall, Nashua, N.H.; Walter J. Conroy, Acton, Mass.

[73] Assignee: Honeywell Information Systems Inc., Waltham, Mass.

[21] Appl. No.: 278,244

[22] Filed: Jun. 29, 1981

[51] Int. Cl.³ .............................................. H01R 13/00
[52] U.S. Cl. ................................................ 339/193 R
[58] Field of Search ............. 339/36, 39, 44 R, 44 M, 339/75 R, 75 M, 191 R, 191 A, 191 L, 191 M, 191 S, 192 R, 192 RL, 192 T, 193 R, 193 N, 193 P, 193 S, 193 VS

[56] References Cited

U.S. PATENT DOCUMENTS 683,579  10/1901  Swoboda ........................ 339/44 R Primary Examiner—Joseph H. McGlynn
Assistant Examiner—Gary F. Paumen
Attorney, Agent, or Firm—George Grayson; Nicholas Prasinos

[57] ABSTRACT

A cathode ray tube display terminal includes a pluggable power supply. A recessed handle for removing the power supply from the CRT terminal is trapped by the AC line cord plug necessitating removal of the plug to permit access to the handle.

3 Claims, 4 Drawing Figures

CATHODE RAY TUBE DISPLAY TERMINAL WITH A REMOVABLE POWER SUPPLY

RELATED APPLICATIONS

The following patent application is assigned to the same assignee as the instant application and has been filed on an even date with the instant application.

"A Cathode Ray Tube Display Terminal Having an Enclosure for Protection of a Logic Board" by Roger L. Hall and Domenic R. Romano, having Ser. No. 278,239 and filed on June 29, 1981.

BACKGROUND OF THE INVENTION

1. Field of the Invention

The invention relates generally to cathode ray tube display terminals and more particularly to the modularized design of the terminal including a pluggable power supply and a means for unplugging the power supply without overloading the electronic components.

2. Description of the Prior Art

Many data processing systems have a cathode ray tube (CRT) display as an element of an operator's console. This display is integrated mechanically into a central processor and may have a separate power supply built into the console or may have power provided from the central power source in the central processor. The Honeywell Level 64 data processor is typical of such a system.

Data processing applications are expanding more and more from batch processing to on-line processing. In batch processing applications, an operator at the operator's console controls the data processor. In on-line processing, a number of CRT display terminals may be coupled to a data processing system via communication lines. An operator at each terminal has access to the data processor.

The need for CRT display terminals has proliferated making the field more competitive for the manufacturer of terminals, thereby requiring the terminals to be more cost effective in the product and maintenance areas.

The prior art CRT display terminals were an integrated design. The power supply was wired into the terminal making trouble shooting and parts replacement costly. In order to make trouble shooting and repair less costly, the elements of the CRT display terminal were modulated and were made pluggable. This enabled the customer at a remote site to make temporary repairs by replacing elements thus eliminating a repair service call. The power supply was made pluggable. A single finger hole was molded into the power supply for grasping the power supply in order to remove it. This solution, however, presented some problems. Excessive force for one finger was required to remove the power supply. Also, if the power supply was removed when the display terminal was in a "Power On" condition, there was a possibility that the electrical components would be damaged.

OBJECTS OF THE INVENTION

Accordingly, it is an object of the invention to provide an improved terminal with the elements readily removable.

It is another object of the invention to provide a power supply that is replaceable by the operator.

It is yet another object of the invention to provide a power supply that may be safely removed by an operator without causing damage to the electrical components of the terminal.

It is still another object of the invention to provide a power supply which may be safely removed from the terminal by the operator without providing an electrical shock to the operator.

SUMMARY OF THE INVENTION

The design of the CRT display terminal is modularized. The power supply is coupled to the terminal hardware by means of a fixed slide and plugs into a fixed connector. An AC line cord with a three-prong connector plugs into the power supply. A hinged wire bail handle is snapped into the molded dress back of the power supply for ease of removal of the power supply from the terminal. The three-prong connector traps the hinged handle in a recess thereby preventing an operator from grasping the handle without removing the three-prong connector. This guarantees that the AC power is removed from the power supply before the power supply is unplugged from the terminal.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which.

DESCRIPTION OF THE PREFERRED EMBODIMENT

Figure 1:
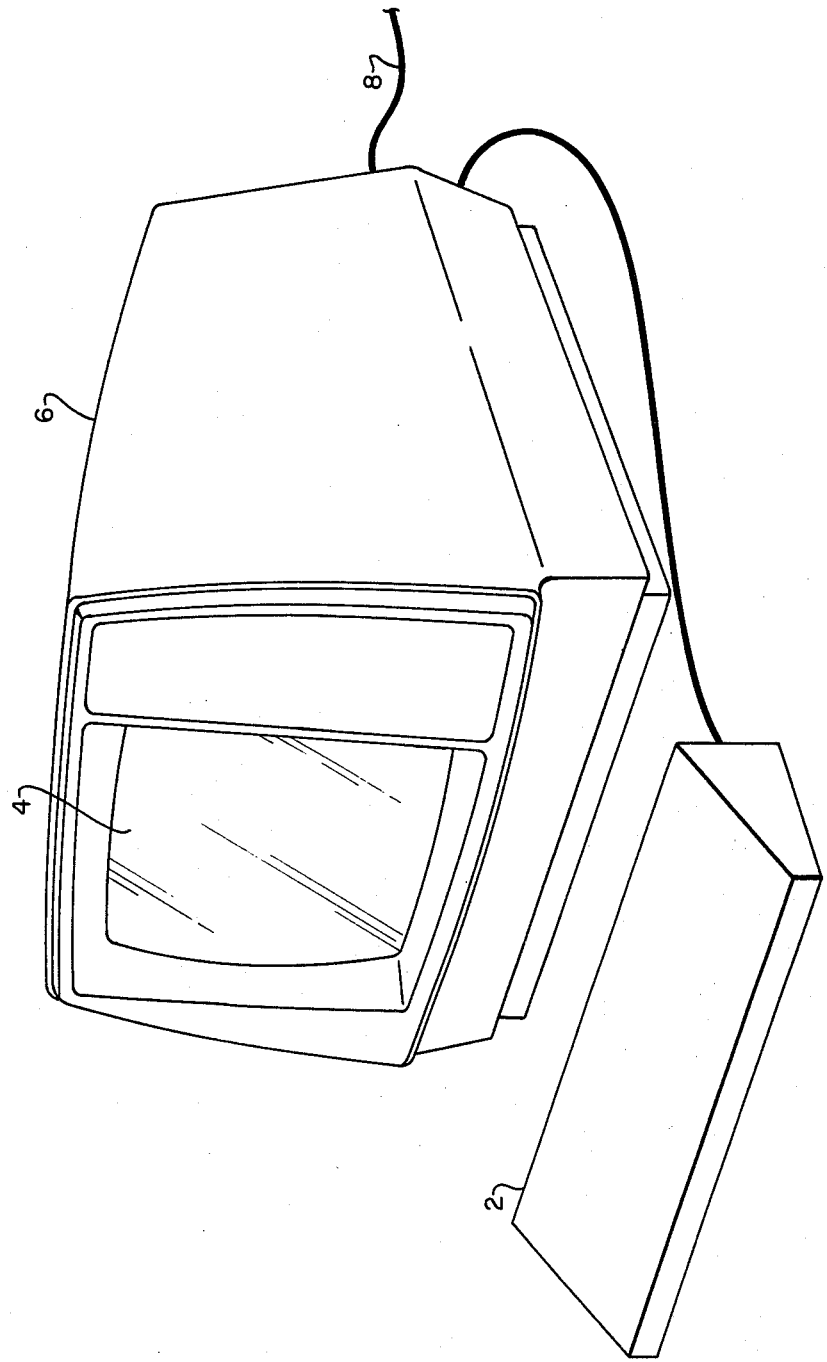
FIG. 1 shows a front view of the cathode ray tube display terminal.

FIG. 1 is a drawing of the cathode ray tube (CRT) display terminal 1 including a keyboard 2, a cathode ray tube (CRT) display 4, a cover 6 and a line cord 8.

Figure 2:
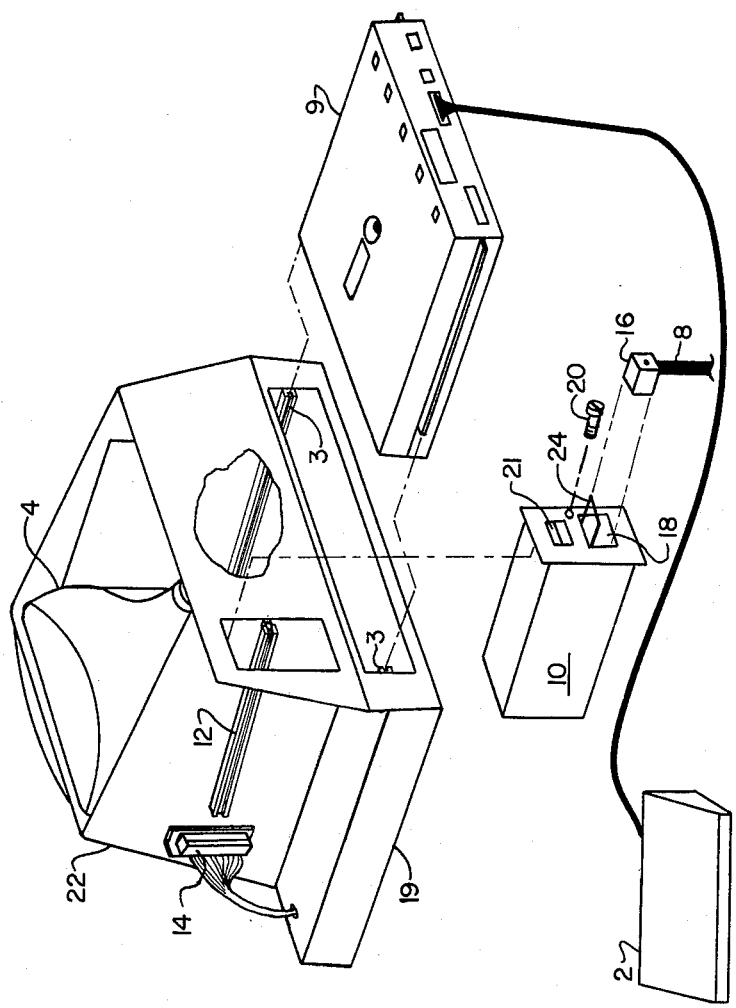
FIG. 2 shows an exploded view of the terminal from the rear.

FIG. 2 shows an exploded view from the rear of the CRT display terminal 1 including a logic board enclosure assembly 9 supported by a pair of slides 3 to a base 19 and plugged into a connector (not shown), and a power supply 10 supported by a slide 12 to the side panel 22 and plugged into a connector 14. The enclosure assembly 9 is described in copending related application Ser. No. 278,239 entitled "A Cathode Ray Tube Display Terminal Having an Enclosure for Protection of the Logic Board". A screw 20 fastens the power supply 10 to the slide 12. A pivoted handle 24 is snapped into the molded back 30 of the power supply 10. The line cord 8 includes a plug 16 which is plugged into a receptacle 18 trapping the handle 24. The power supply 10 is removed from the CRT display terminal 1 by loosening screw 20, removing plug 16 from receptacle 18, and pulling pivoted handle 24 which is now free. The power supply 10 will be guided by slide 12 and may be removed from the rear of the CRT display terminal 1. This results in external power being removed from power supply 10 before power supply removal, regardless of the position of power switch 21.

Figure 3:
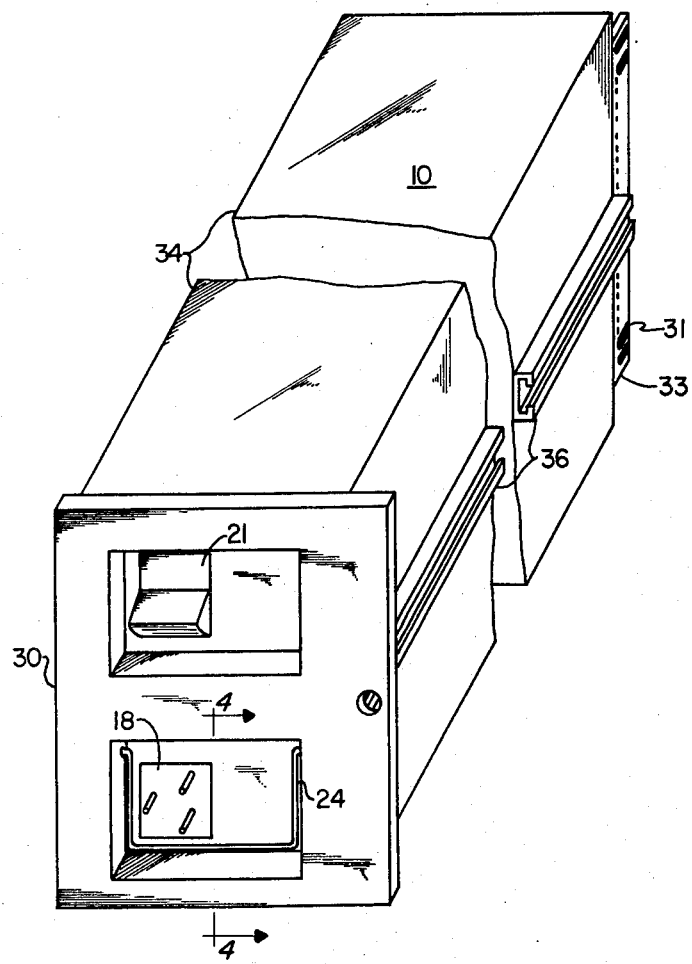
FIG. 3 shows a detailed exploded view of the power supply.

FIG. 3 shows the power supply 10. A molded back 30 fastened to a frame 34 supports the ends of the pivoted handle 24. Openings in molded back 30 provide access to the power switch 21 and the receptacle 18. Slide 36 mounted to frame 34 engages slide 12 of FIG. 2, guiding the connector fingers 31 of a printed circuit board 33 into connector 14.

Figure 4:
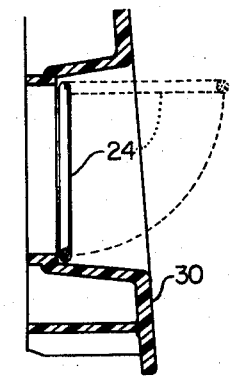
FIG. 4 is a cross-section view of molded back 30.

FIG. 4 is a cross-section view of molded back 30 to show the movement of handle 24 with plug 16 removed.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A cathode ray tube display terminal includes a power supply mounted to a chassis of said terminal by means of a slide, said power supply including connector fingers for engaging a fixed connector when said power supply is fully inserted into said fixed connector, said power supply being coupled to a power source through an electrical plug, said power supply comprising:

a molded plate having a plurality of openings;

a handle pivotally mounted to said molded plate within a first opening; and an electrical receptacle accessible through said first opening for receiving said electrical plug for applying electrical power to said power supply, thereby trapping said handle between said molded plate and said electrical plug;

said handle being freed to pivot when said electrical plug is removed from said electrical receptacle for removing said electrical power from said power supply, said handle being accessible for unplugging said power supply from said terminal.

2. The terminal of claim 1 wherein said molded plate includes a second opening for providing means for allowing a screw to fasten said power supply to said slide.

3. The terminal of claim 2 wherein said molded plate includes a third opening for making a power switch accessible for applying said electrical power to said power supply when said electrical plug provides said electrical power to said electrical receptacle.

* * * * *